Dec. 28, 1937.  G. MORRELL  2,103,546
METHOD OF PRODUCING VARICOLORED CASEIN
Filed June 10, 1935  2 Sheets-Sheet 1
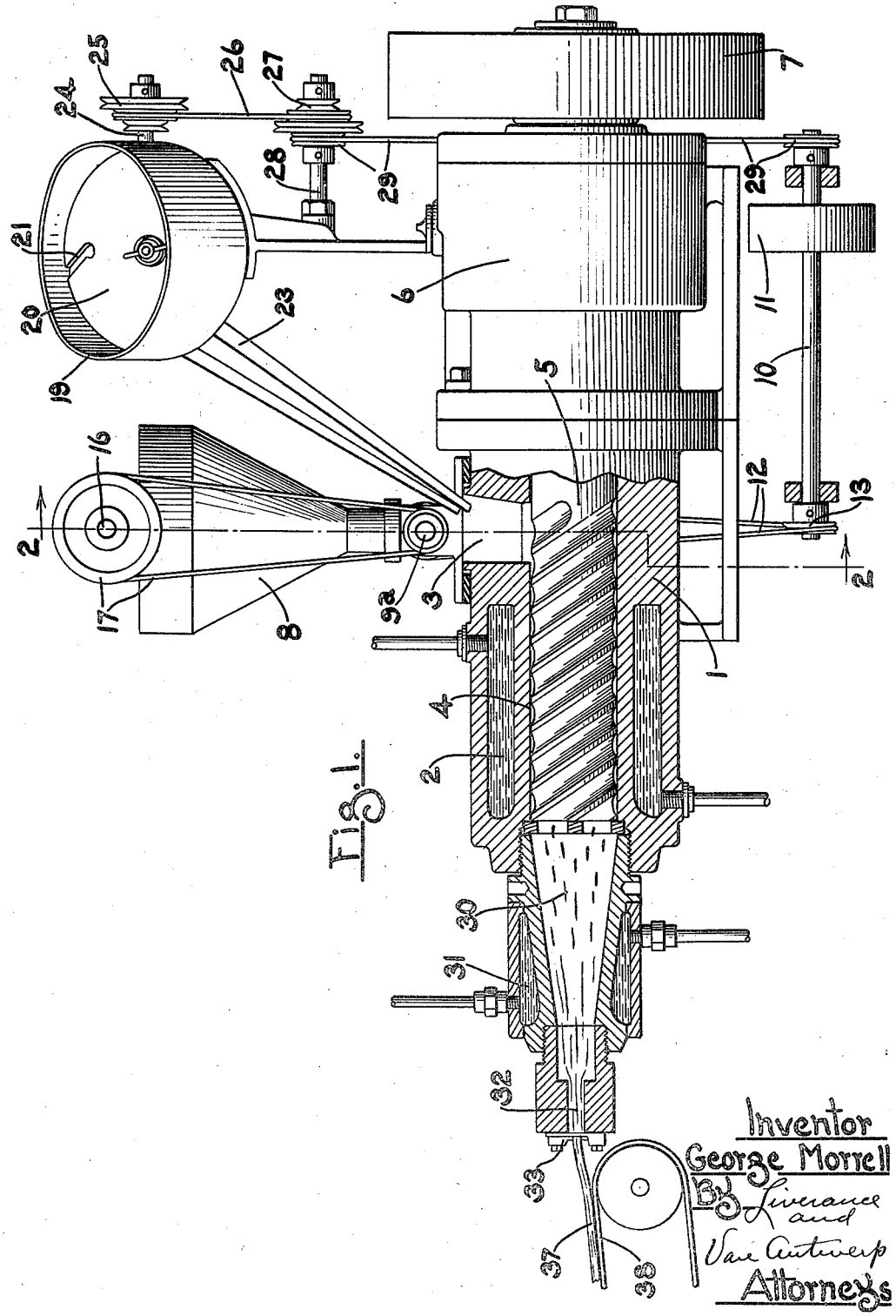
Inventor
George Morrell
By Liverance and Van Antwerp
Attorneys Dec. 28, 1937.  G. MORRELL  2,103,546
METHOD OF PRODUCING VARICOLORED CASEIN
Filed June 10, 1935  2 Sheets-Sheet 2
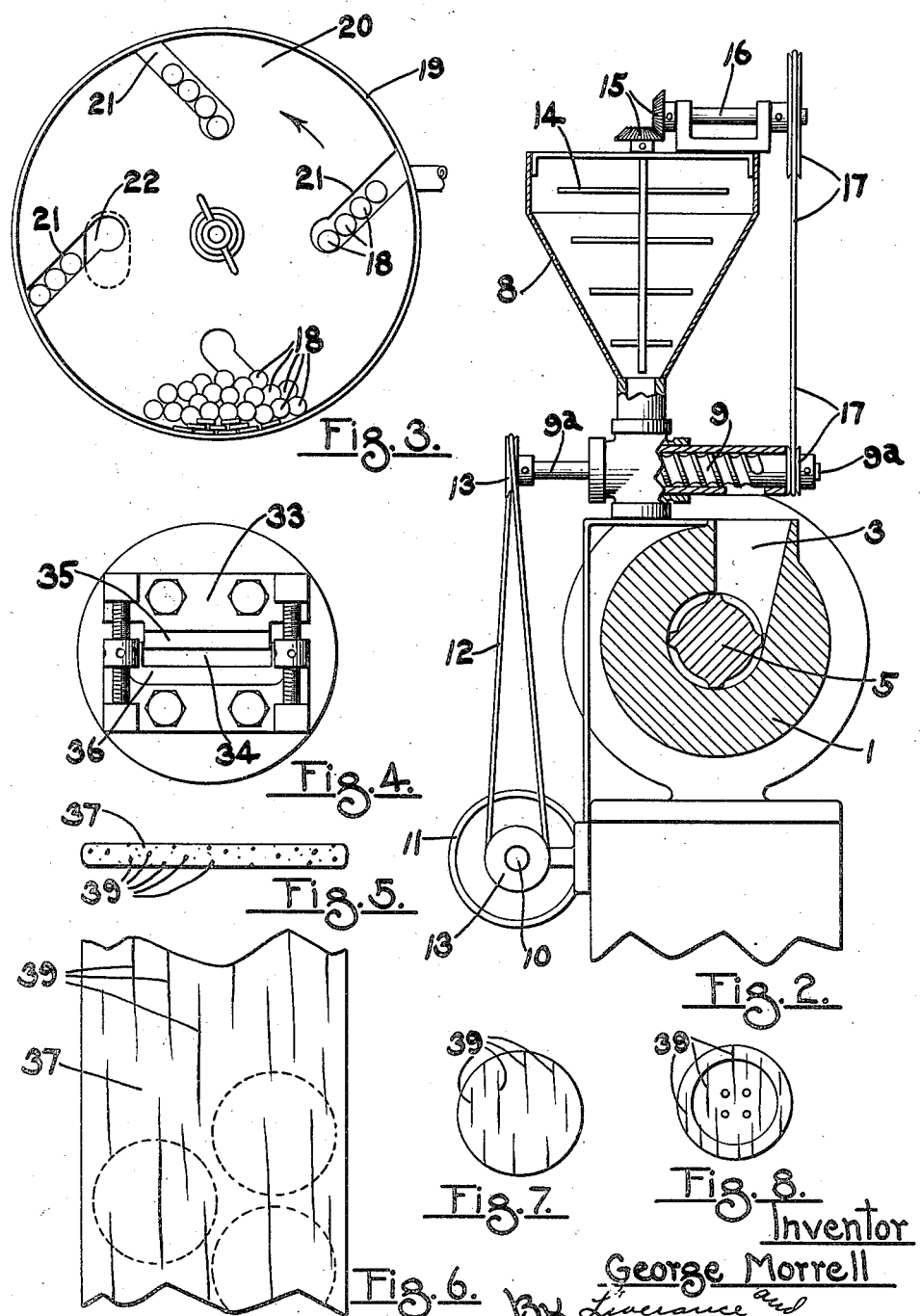
Inventor
George Morrell
By Liverance and Van Antwerp
Attorneys

UNITED STATES PATENT OFFICE 2,103,546

METHOD OF PRODUCING VARICOLORED CASEIN

George Morrell, Muskegon, Mich., assignor to George Morrell Corporation, Muskegon Heights, Mich., a corporation of Michigan Application June 10, 1935, Serial No. 25,950

7 Claims. (Cl. 18—48.8)

This invention relates to making varicolored casein products and more particularly a machine and process for producing a casein base material which has elongated colored strips distributed throughout its body. From this base material articles are manufactured such as buttons which when finished display the irregular striped effect simulating animal horn.

To produce the desired effect the casein body material which is commercially known as rennet casein in powdered or granulated form is converted or homogenized by compression, application of heat and extrusion into an elongated shape and during this process small bodies of casein of contrasting color which have been previously converted or homogenized or compressed and/or extruded are distributed throughout the mass of the body material, and these small portions of contrasting color, by the extrusion process, are caused to appear in the extruded body as irregular elongated stripes.

The invention utilizes a casein extruding machine of conventional form but adds to it means for accurately feeding the contrasting colored bodies into the body material in fixed relationship thereto and for varying the relations between body material and colored portions.

The invention provides various new and useful features of construction as hereinafter more fully described and particularly pointed out in the claims, reference being had to the accompanying drawings, in which Fig. 1 is a side elevation, partly in section, of an extruding machine embodying this invention and by means of which the new process is performed.

Fig. 2 is a transverse section of the same on the line 2—2 of Fig. 1.

Fig. 3 is a plan view of the colored disk feeding hopper.

Fig. 4 is an end view of the extruding die.

Fig. 5 is a cross section of the extruded material.

Fig. 6 is a fragmentary plan view of said material.

Fig. 7 is a plan view of a blank for a button cut from said material, and

Fig. 8 is a plan view of a finished button made therefrom.

Like reference numbers refer to like parts in all the figures.

The extruding machine which in part is old and conventional comprises a body 1 which preferably is provided with a water jacket 2 and has an entrance opening 3 communicating with the screw chamber 4 in which the feed screw 5 is located and rotates. The feed screw 5 is connected to and driven by suitable gearing of conventional form located within a housing 6 and driven by a pulley 7 from a suitable power source.

A hopper 8 is provided to receive the rennet casein which is to form the body material and this hopper has a feed screw conveyor 9 at its outlet end which removes the casein material in even measured quantities from the hopper and deposits it into the inlet 3 of the screw chamber. A shaft 10 driven from a suitable source by pulleys 11 is connected by belt and pulleys 12 and 13 to the shaft 9a of the feed screw 9 and in order to insure proper feeding of the material from the hopper and agitator 14 is rotatably located therein and is driven through gears 15, a shaft 16 and belt and pulleys 17 from the feed screw shaft 9a.

The contrasting colored particles are preferably provided in the form of discs 18 and are fed from a hopper 19 suitably supported on the machine. This hopper has means for feeding the discs 18 therefrom in accurately timed ratio with the material fed from the hopper 8 which means consists of a rotated disc 20 in the bottom of the hopper 19 which disc has openings 21 therethrough. These openings are arranged to register, as the disc rotates, with an outlet opening 22 in the bottom of the hopper 19 through which the discs may drop into a chute 23 which communicates with the inlet 3 of the extruding machine.

The feed disc 20 as it rotates receives the colored discs 18 in the opening 21 and being located in an inclined plane carries these discs upwardly and deposits them one at a time in the outlet opening 22 as they pass this opening. This specific feed mechanism is conventional and the disc 20 is driven by gearing, not shown, connected with the shaft 24. The shaft 24 has stepped pulleys 25 and is driven by a belt 26 from stepped pulleys 27 on a shaft 28. The shaft 28 is rotated by belt and pulleys 29 from the shaft 10. By this means a fixed ratio of feed between the body material in the hopper 8 and the color discs in the hopper 19 is maintained and this ratio may be changed by changing the belt 26 on the stepped pulleys 25 and 27 which will alter the relative speed of rotation of the disc 20.

The material from the feed screw 5 is forced into a tapered chamber 30 which is also provided with a water jacket 31 and from this chamber 30 the material is forced into an outlet passage 32 which leads to an extrusion die 33. The die 33 preferably has an elongated opening 34 which is encompassed by suitable die members 35 and 36 which specifically form no part of the present invention. This elongated die opening produces a flat ribbon like strip 37 of extruded casein material which is deposited upon a moving conveyor belt 38.

Operation

The rennert casein in its original condition is quite mobile and compressible and during its passage through the extruding machine it undergoes a change of nature and after having once been converted or homogenized by this pressure operation and extrusion it has lost the mobility which it originally possessed. The colored discs 18 are of casein material which has been converted by compression and/or extrusion and this material lacks the mobility and plasticity of the unconverted casein and has a tendency to cling together during the extruding process and not separate or distintegrate and disseminate throughout the mass.

The body material of unconverted rennert casein is fed from the hopper 8 by the feed screw 9 and deposited in the inlet 3 of the machine and this material preferably constitutes the bulk of the mass of casein entering the machine. At the same time and at periodic intervals a disc of contrasting colored casein 18 is also introduced into the mass through the inlet 3.

As the machine operates the body material with the color discs 18 is forced by the screw 5 through the machine and is compressed and heated therein, heat being applied by means of the water jackets surrounding the machine. As the material is reduced in cross sectional area by the tapered shape of the chamber 30 it is both compressed and tends to elongate and this compression and elongation is further accomplished as material is forced through the outlet passage 32 and through the extrusion die 33.

During this compression and extrusion process the color discs distributed more or less evenly throughout the mass have tended to cling together but have been forced to distort their shapes into elongated strips and these elongated strips of contrasting colored material indicated by 39 appear throughout the body of the extruded strip.

The uniformity of feeding the color discs 18 has maintained a uniform proportion of colored material in the mass but the uncertainty of placement of these particles and of maintenance of their positions during the extruding process has resulted in a certain irregularity of placement and shape which produces the desired effect. The colored strips all extend substantially longitudinally of the extruded piece and are substantially parallel and are also substantially equally distributed throughout the mass but in coming through the machine and process they have become sufficiently irregular in shape and in placement to avoid a stiff artificial colored stripe effect.

The color and pattern effect may be altered by varying the ratio of color material fed into the body mass which in the present machine is accomplished by changing the belt 26 on the stepped pulleys 25 and 27 and alters the ratio of speed of rotation of the feed disc 20.

The extruded material which is preferably the ribbon 37 may be used to make various articles of which buttons is a good example. Different methods of making a button from this extruded ribbon may be resorted to but in any event the button will be cut from the plane of the ribbon and will have a color strip extending crosswise of its face as illustrated in Fig. 6. By this method buttons very closely simulating animal horn buttons may be made and of course utilizing various other colors will also provide other attractive color combinations.

The invention is defined in the appended claims and is not to be limited otherwise than required by the terms of said claims.

I claim:

1. The method of producing varicolored casein which consists of subjecting unconverted rennet casein body material, in which are distributed particles of converted casein of contrasting color, to pressure and elongation.

2. The method of producing varicolored casein which consists of subjecting unconverted rennet casein body material, in which are distributed particles of converted casein of contrasting color, to pressure, elongation and extrusion.

3. The method of producing varicolored casein which consists of subjecting unconverted rennet casein body material, in which are distributed particles of converted casein of contrasting color, to pressure and heat and elongation.

4. The method of producing varicolored casein which consists of subjecting unconverted rennet casein body material, in which are distributed particles of converted casein of contrasting color, to pressure, heat, elongation and extrusion.

5. The method of producing varicolored casein which consists of feeding unconverted rennet casein body material, periodically depositing particles of converted casein of contrasting color into said body material and subjecting said body material with said particles of contrasting color therein to pressure and elongation.

6. The method of producing varicolored casein which consists of providing a quantity of unconverted rennet casein body material, interspersing particles of converted casein of contrasting color uniformly throughout said quantity of body material and subjecting said body material with said particles of contrasting color therein to elongation and pressure.

7. The method of producing an irregularly colored casein product which consists in converting rennet casein by pressure, mixing particles of said converted casein with unconverted rennet casein of a contrasting color, and subjecting said mixture of unconverted rennet casein and particles of converted casein of contrasting color to pressure and elongation.

GEORGE MORRELL.